United States Patent
Mohan Raj et al.

(10) Patent No.: US 12,483,892 B2
(45) Date of Patent: Nov. 25, 2025

(54) METHODS, SYSTEMS, AND COMPUTER READABLE MEDIA FOR AUTHENTICATION BETWEEN NETWORK FUNCTION REPOSITORY FUNCTIONS ACROSS DIFFERENT NETWORKS

(71) Applicant: Oracle International Corporation, Redwood Shores, CA (US)

(72) Inventors: John Nirmal Mohan Raj, Bangalore (IN); Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 302 days.

(21) Appl. No.: 18/142,887

(22) Filed: May 3, 2023

(65) Prior Publication Data
US 2024/0373224 A1 Nov. 7, 2024

(51) Int. Cl.
| | |
|---|---|
| H04W 8/08 | (2009.01) |
| H04L 9/32 | (2006.01) |
| H04L 9/40 | (2022.01) |
| H04W 12/069 | (2021.01) |
| H04W 12/084 | (2021.01) |

(52) U.S. Cl.
CPC ......... *H04W 12/084* (2021.01); *H04L 9/3247* (2013.01); *H04L 63/102* (2013.01); *H04L 63/20* (2013.01); *H04W 12/069* (2021.01)

(58) Field of Classification Search
None
See application file for complete search history.

(56) References Cited

U.S. PATENT DOCUMENTS

| | | | |
|---|---|---|---|
| 2022/0158847 A1* | 5/2022 | Aggarwal | H04W 12/069 |
| 2022/0294775 A1* | 9/2022 | Singh | H04L 63/0884 |

(Continued)

FOREIGN PATENT DOCUMENTS

| | | | | |
|---|---|---|---|---|
| CN | 117255346 A | * | 12/2023 | H04W 12/069 |
| WO | WO-2022237741 A1 | * | 11/2022 | H04W 12/084 |
| WO | WO-2023183156 A1 | * | 9/2023 | H04L 63/123 |

OTHER PUBLICATIONS

Jones et al., JSON Web Signature, IETF RFC 7515 (May 2015).

(Continued)

*Primary Examiner* — Christopher B Robinson
(74) *Attorney, Agent, or Firm* — Jenkins, Taylor & Hunt, P.A.

(57) ABSTRACT

A method for authenticating between network function (NF) repository functions (NRFs) across different networks includes receiving, at an NRF in a first network, a request message from an NRF in a second network separate from the first network. The method further includes determining, by the NRF in the first network, that the request message includes a roaming client credentials assertion (CCA) header. The method further includes, in response to determining that the request message includes a roaming CCA header, reading contents of the header. The method further includes authenticating the request message using the contents of the roaming CCA header. The method further includes, in response to successful authentication of the request message, generating a response message to the request message and transmitting the response message to the NRF in the second network.

20 Claims, 8 Drawing Sheets

(56) References Cited

U.S. PATENT DOCUMENTS

| | | | |
|---|---|---|---|
| 2022/0338104 A1* | 10/2022 | Son | H04W 12/06 |
| 2022/0360586 A1* | 11/2022 | Aggarwal | H04W 48/16 |
| 2023/0019000 A1* | 1/2023 | Li | H04W 12/08 |

OTHER PUBLICATIONS

"3rd Generation Partnership Project; Technical Specification Group Services and System Aspects; Security architecture and procedures for 5G system (Release 18)" 3GPP TS 33.501 V18.0.0 (Dec. 2022).

"3rd Generation Partnership Project; Technical Specification Group Core Network and Terminals; 5G System; Network Function Repository Services; Stage 3 (Release 18)" 3GPP TS 29.510, V18.1.0 (Dec. 2022).

\* cited by examiner

METHODS, SYSTEMS, AND COMPUTER READABLE MEDIA FOR AUTHENTICATION BETWEEN NETWORK FUNCTION REPOSITORY FUNCTIONS ACROSS DIFFERENT NETWORKS

TECHNICAL FIELD

The subject matter described herein relates to authenticating messages across different networks. More particularly, the subject matter described herein relates to methods, systems, and computer readable media for authentication between network function (NF) repository functions (NRFs) across different networks.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for application programming interface (API) messages that are transmitted between PLMNs.

One problem that exists in 5G and other types of networks is that there is no defined mechanism for authentication between NRFs for access token requests in roaming scenarios. 3GPP TS 33.501 indicates that NF service producers register as OAuth 2.0 resource servers with their local NRF, which functions as an OAuth 2.0 authorization server. The NF service consumer functions as an OAuth 2.0 client. To request a service from an NF service producer, the NF service consumer must request from the NRF an OAuth 2.0 access token for the NF service producer. The NRF validates the access token request and provides the OAuth 2.0 access token to the NF service consumer. The NF service consumer transmits a service request including the OAuth 2.0 access token to the NF service producer. The NF service producer validates the OAuth 2.0 access token and responds to the service request.

In roaming scenarios, 3GPP TS 33.501 states that the vNRF functions as the OAuth 2.0 authorization server for the vPLMN and authenticates the NF service consumer, the hNRF functions as the OAuth 2.0 authorization server and generates the access token, the NF service consumer in the vPLMN is the OAuth 2.0 client, and the NF service producer in the hPLMN is the OAuth 2.0 resource server. One problem with this scenario is that 3GPP TS 33.501 indicates that the authentication between the vNRF and hNRF is "implicit authentication" (see FIG. 13.4.1.2.2-1). 3GPP TS 33.501 also states, "The two NRFs are implicitly authenticated via N32 mutual authentication of SEPPs." Relying on implicit authentication via SEPPs is a security risk for inter-PLMN communications between NRFs.

Accordingly, there exists a need for improved methods, systems, and computer readable media for authenticating communications between NRFs across different networks.

SUMMARY

A method for authenticating between network function (NF) repository functions (NRFs) across different networks includes receiving, at an NRF in a first network, a request message from an NRF in a second network separate from the first network. The method further includes determining, by the NRF in the first network, that the request message includes a roaming client credentials assertion (CCA) header. The method further includes, in response to determining that the request message includes a roaming CCA header, reading contents of the header. The method further includes authenticating the request message using the contents of the roaming CCA header. The method further includes, in response to successful authentication of the request message, generating a response message to the request message and transmitting the response message to the NRF in the second network.

According to another aspect of the subject matter described herein, the NRF in the first network operates as a home NRF and the NRF in the second network operates as a visited NRF.

According to another aspect of the subject matter described herein, receiving the request message comprises receiving an access token request message.

According to another aspect of the subject matter described herein, receiving the access token request message comprises receiving an OAuth 2.0 access token request message.

According to another aspect of the subject matter described herein, the OAuth 2.0 access token request message is received from an NF service consumer in the second network.

According to another aspect of the subject matter described herein, the OAuth 2.0 access token request is received from a service communication proxy (SCP) in the second network.

According to another aspect of the subject matter described herein, reading contents of the roaming CCA header includes reading a public key certificate from the request message and authenticating the request message includes determining that the public key certificate was issued from a trusted source and is unexpired.

According to another aspect of the subject matter described herein, reading contents of the roaming CCA header includes reading a digital signature and a public key from the roaming CCA header and validating the digital signature using the public key.

According to another aspect of the subject matter described herein, reading contents of the roaming CCA header includes reading CCA claims from the CCA header and verifying the CCA claims using CCA claims stored at the NRF in the first network.

According to another aspect of the subject matter described herein, verifying the CCA claims includes determining whether a subject claim of the roaming CCA header matches an NF instance ID of the NRF in the second network, determining that an audience claim in the roaming CCA header matches an audience type of the NRF In the first network, and validating a timestamp and an expiration time in the roaming CCA header.

According to another aspect of the subject matter described herein, a system for authenticating between network function (NF) repository functions (NRFs) across different networks is provided. The system includes an NRF for operating in a first network and including at least one processor and a memory. The system further includes a request message and roaming CCA header validator for receiving a request message from an NRF in a second network separate from the first network, determining that the request message includes a roaming client credentials assertion (CCA) header, in response to determining that the request message includes a roaming CCA header, reading contents of the header, authenticating the request message using the contents of the roaming CCA header, and in response to successful authentication of the request message, generating a response message to the request message and transmitting the response message to the NRF in the second network.

According to another aspect of the subject matter described herein, the NRF in the first network operates as a home NRF and the NRF in the second network operates as a visited NRF.

According to another aspect of the subject matter described herein, the request message comprises an access token request message.

According to another aspect of the subject matter described herein, the access token request message comprises an OAuth 2.0 access token request message.

According to another aspect of the subject matter described herein, the OAuth 2.0 access token request message is received from an NF service consumer or a service communication proxy (SCP) in the second network.

According to another aspect of the subject matter described herein, in reading contents of the roaming CCA header, the request message and roaming CCA header validator is configured to read a public key certificate from the roaming CCA header and, in authenticating the request message, the request message and roaming CCA header validator is configured to determine that the public key certificate was issued from a trusted source and is unexpired.

According to another aspect of the subject matter described herein, in reading contents of the roaming CCA header, the request message and roaming CCA header validator is configured to read a digital signature and a public key from the roaming CCA header and, in authenticating the request message, the request message and roaming CCA header validator is configured to validate the digital signature using the public key.

According to another aspect of the subject matter described herein, in reading contents of the roaming CCA header, the request message and roaming CCA header validator is configured to read CCA claims from the CCA header and, in authenticating the request message, the request message and roaming CCA header validator is configured to verify the CCA claims using CCA claims stored at the NRF configured to operate in the first network.

According to another aspect of the subject matter described herein, in verifying the CCA claims, the request message and roaming header CCA validator is configured to determine whether a subject claim of the roaming CCA header matches an NF instance ID of the NRF in the second network, determine that an audience claim of the roaming CCA header matches an audience type of the NRF In the first network, and validating a timestamp and an expiration time in the roaming CCA header.

According to another aspect of the subject matter described herein, a non-transitory computer readable medium having stored thereon executable instructions that when executed by a processor of a computer controls the computer to perform steps is provided. The steps include receiving, at a network function (NF) repository function (NRF) in a first network, a request message from an NRF in a second network separate from the first network. The steps further include determining, by the NRF in the first network, that the request message includes a roaming client credentials assertion (CCA) header. The steps further include, in response to determining that the request message includes a roaming CCA header, reading contents of the header. The steps further include authenticating the request message using the contents of the roaming CCA header. The steps further include, in response to successful authentication of the request message, generating a response message to the request message and transmitting the response message to the NRF in the second network.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
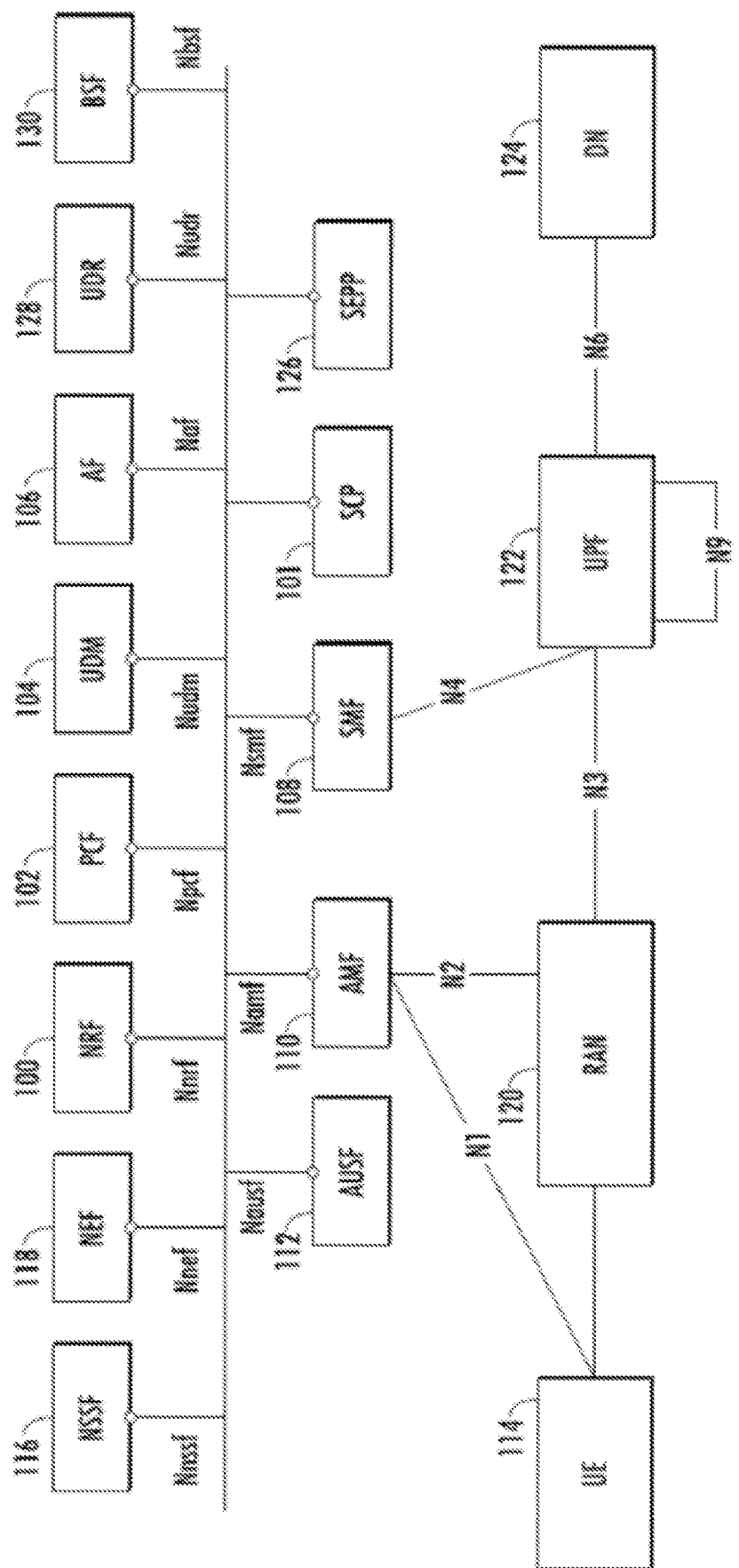
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

Figure 2:
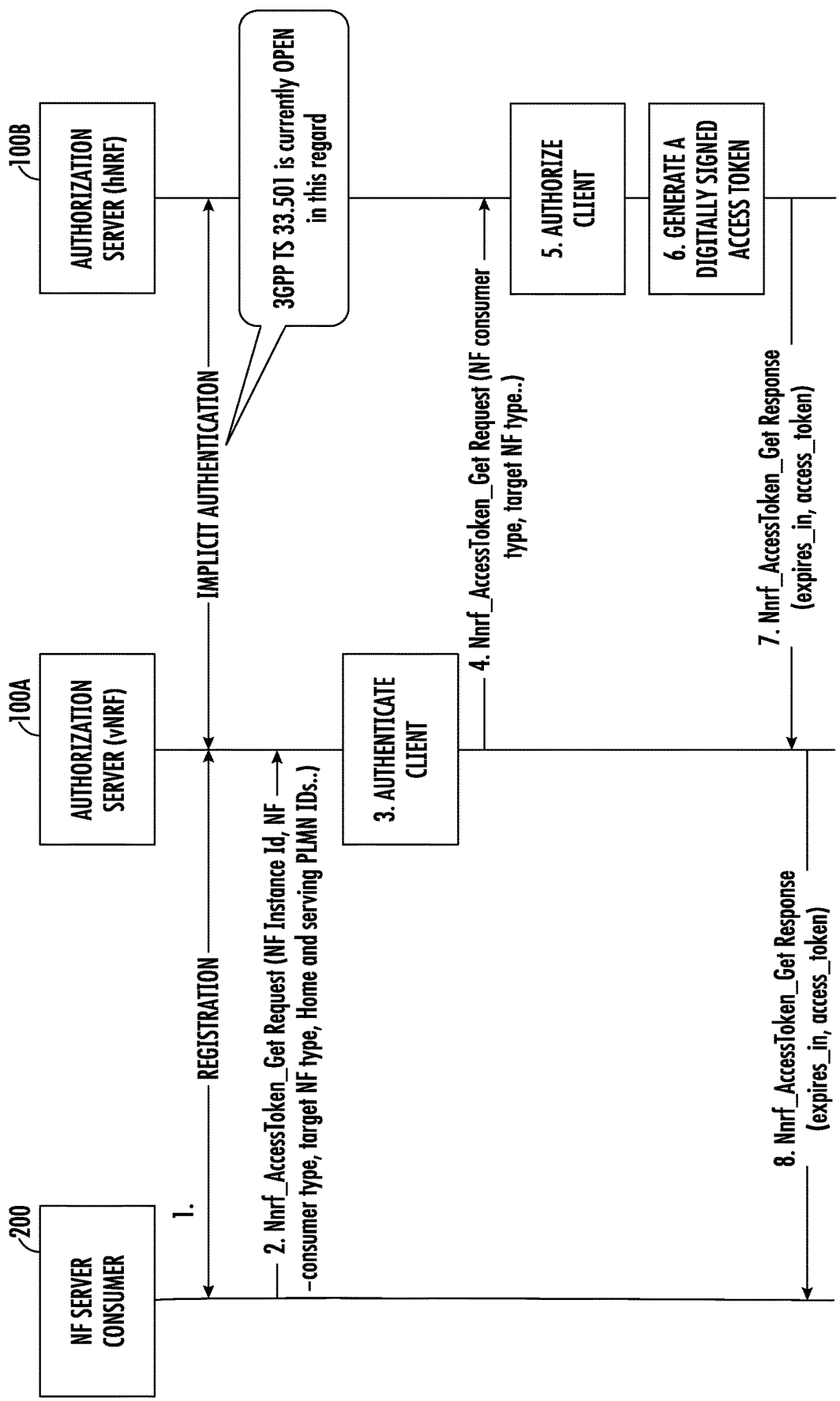
FIG. 2 is a message flow diagram illustrating inter-PLMN communications between NRFs that relies on implicit authentication for the inter-PLMN communications.

As stated above, one problem that can occur in 5G and other types of networks is that inter-PLMN communications between NRFs as defined in 3GPP TS 33.501 rely on implicit authentication to secure communications, such as an access token request, from the vNRF. FIG. 2 is a message flow diagram illustrating inter-PLMN communications between NRFs that rely on implicit authentication between the NRFs. Referring to FIG. 2, in step 1, NF service consumer 200 registers with vNRF 100A. Again, according to 3GPP TS 33.501, authentication between vNRF 100A and hNRF 100B is implicit via their respective SEPPs. Only transitive trust exists between vNRF 100A and hNRF 100B. vNRF 100A and a vSEPP authenticate with each other, the vSEPP and an hSEPP authenticate with each other, and the hSEPP and hNRF 100B authenticate with each other. There is no direct authentication between vNRF 100A and hNRF 100B.

vNRF 100A functions as the OAuth 2.0 authorization server for the vPLMN, and hNRF 100B functions as the OAuth 2.0 authorization server for the hPLMN. In step 2 of the message flow diagram, NF service consumer 200 sends an access token request message to vNRF 100A requesting an access token for an NF service producer in the hPLMN. The access token request may identify an NF type of a producer NF in the hPLMN or a specific NF instance ID of a producer NF in the hPLMN. In step 3, vNRF 100A authenticates NF service consumer 200. vNRF 100A identifies the access token request as being directed to the hPLMN based on the home PLMN ID in the access token request and, in step 4, forwards the access token request to hNRF 100B. hNRF 100B, in step 5, authorizes NF service consumer 200 by determining that NF service consumer 200 is authorized to access the services requested in the access token request. However, hNRF 100B does not authenticate vNRF 100A.

In step 6, hNRF 100B generates an OAuth 2.0 access token with appropriate claims as defined in clause 13.4.1.1 of 3GPP TS 33.501. hNRF 100B digitally signs the access token based on a shared secret with NF service consumer 200 or a private key as specified in Internet Engineering Task Force (IETF) Request for Comments (RFC) 7515. In step 7, HRF 100B generates an access token response message and forwards the access token response message to vNRF 100A. In step 8, vNRF 100A forwards the access token response to NF service consumer 200. NF service consumer 200 stores the received access token and can use the access token for accessing services from NF service producers in the hPLMN during the validity time of the access token. However, because there is no authentication between the NRFs, a hacker could impersonate NF service consumer 200 and/or the vNRF and gain unauthorized access to services in the hPLMN.

To avoid the difficulties described with respect to FIG. 2, the subject matter described herein utilizes a roaming client credentials assertion (CCA) header with CCA claims and appends the header to the access token request message transmitted between PLMNs. The hNRF, upon receiving the access token request, determines whether the roaming CCA header is present. If the header is present, the hNRF authenticates the vNRF by validating the roaming CCA header. If the validation is successful, the hNRF generates an access token, signs the access token, and provides the access token to the vNRF in an access token response message.

Figure 3:
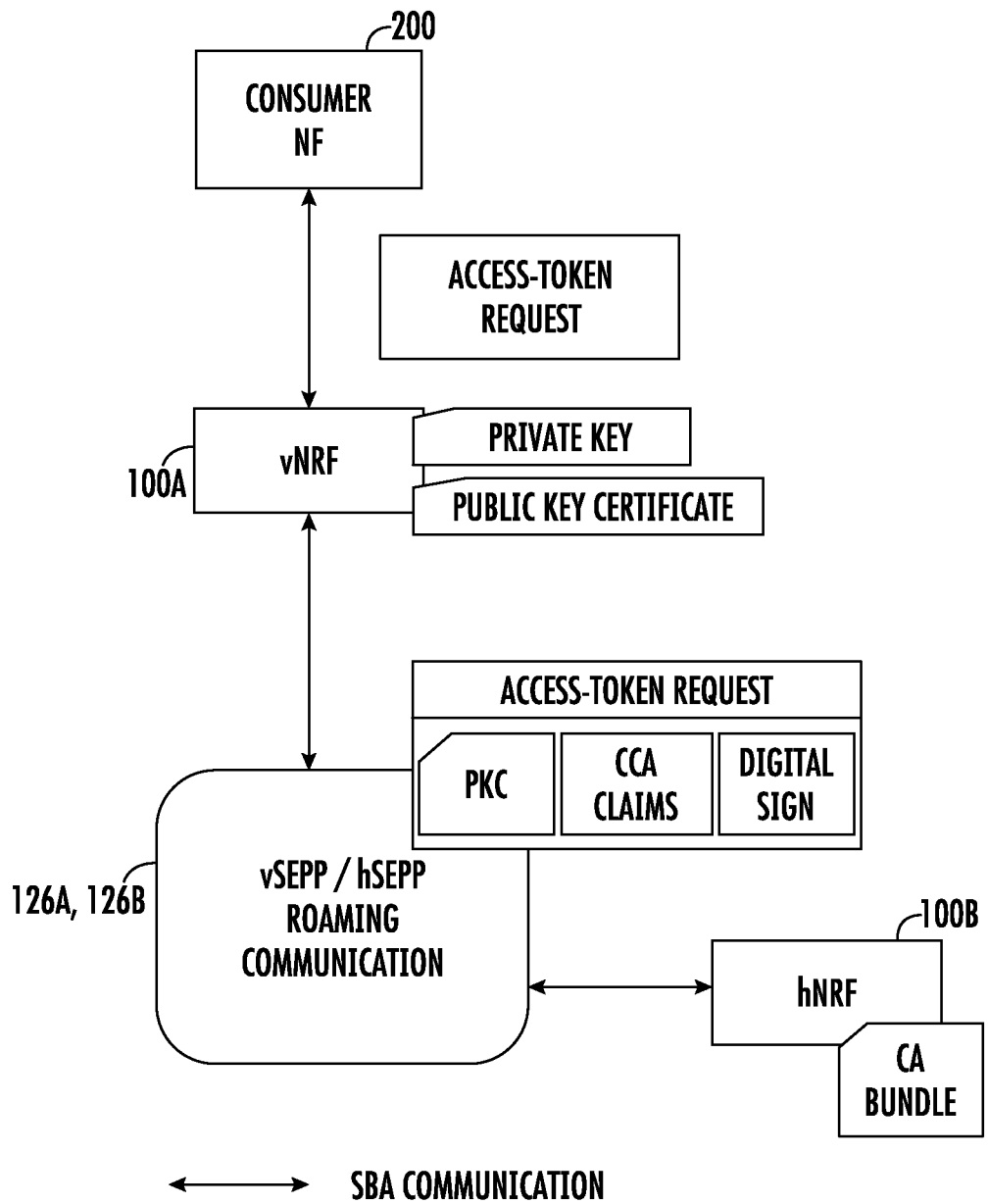
FIG. 3 is a network diagram illustrating inter-PLMN communications between NRFs where an access token request is secured using a roaming CCA header.

FIG. 3 is a network diagram illustrating inter-PLMN communications between NRFs where an access token request is secured using a roaming CCA header. In FIG. 3, vNRF 100A receives an access token request from NF service consumer 200. vNRF 100A recognizes the access token request as being directed to the hPLMN. vNRF 100A generates a roaming CCA header and appends the roaming CCA header to the access token request. The roaming CCA header includes a public key certificate of vNRF 100A, CCA claims, and a digital signature created with a private key of vNRF 100A. The CCA claims may include a subject claim specifying an NF instance ID of hNRF 100B, an audience claim identifying NRF as the audience type, a timestamp, and an expiration time. vNRF 100A forwards the access token request with the roaming CCA header to hNRF 100B via vSEPP 126A and hSEPP 126B. hNRF 100B receives the access token request and validates the roaming CCA header before processing the access token request. Validating the roaming CCA header may include determining that the public key certificate was issued from a trusted source, such as a certificate authority, and is unexpired, verifying the digital signature using the public key of vNRF 100A obtained from the public key certificate, and verifying that the CCA claims have expected values. For example, hNRF 100B may determine whether the subject claim identifies hNRF 100B as the subject, the audience claim identifies NRF as the audience type, the timestamp is within an expected range, and the expiration time has not expired. If hNRF 100B determines that the roaming CCA header is valid, hNRF 100B generates an OAuth 2.0 access token, digitally signs the OAuth 2.0 access token, and forwards the OAuth 2.0 access token to vNRF 100A in an access token response. If hNRF 100B determines that the roaming CCA header is not valid, hNRF 100B may send an error response in response to the access token request.

Figure 4:
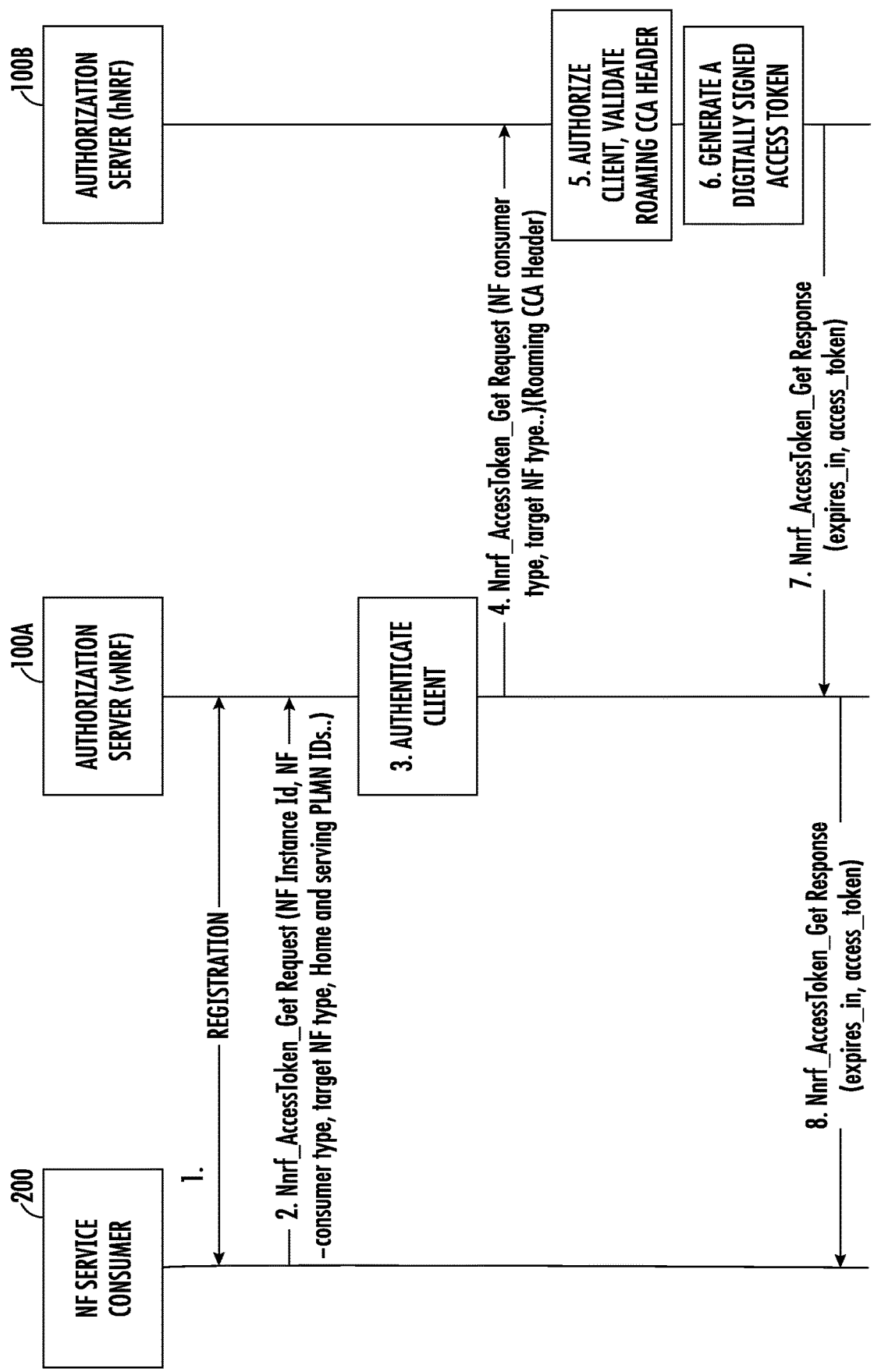
FIG. 4 is a message flow diagram illustrating inter-PLMN communications between NRFs where the access token request is secured using the roaming CCA header.

FIG. 4 is a message flow diagram illustrating inter-PLMN communications between NRFs where the access token request is secured using the roaming CCA header. Referring to FIG. 4, in step 1, NF service consumer 200 registers with vNRF 100A. vNRF 100A functions as the OAuth 2.0 authorization server for the vPLMN, and hNRF 100B functions as the OAuth 2.0 authorization server in the hPLMN. In step 2, NF service consumer 200 sends an access token request message to vNRF 100A requesting an access token for an NF service producer in the hPLMN. The access token request may identify an NF type of a producer NF in the hPLMN or a specific NF instance ID of a producer NF in the hPLMN. In step 3, vNRF 100A authenticates consumer NF 200. vNRF 100A identifies the access token request as being directed to the hPLMN based on the home PLMN ID in the access token request, generates the roaming CCA header, and appends the roaming CCA header to the access token request. In step 4, vNRF 100A forwards the access token request including the roaming CCA header to hNRF 100B. hNRF 100B, in step 5, authorizes NF service consumer 200 and validates the roaming CCA header. As indicated above, validating the roaming CCA header may include determining that the public key certificate is issued from a trusted source and is unexpired, verifying the digital signature using the public key of vNRF 100A, and verifying that the CCA claims have expected values.

In step 6, hNRF 100B generates an OAuth 2.0 access token with appropriate claims as defined in clause 13.4.1.1 of 3GPP TS 33.501. hNRF 100B digitally signs the access token based on a shared secret with NF service consumer 200 or a private key as specified in IETF RFC 7515. In step 7, hNRF 100B generates an access token response message and forwards the access token response message to vNRF 100A. In step 8, vNRF 100A forwards the access token response message to NF service consumer 200. NF service consumer 200 stores the received access token and can use the access token for accessing services from NF service producers in the hPLMN during the validity time of the access token.

Figure 5:
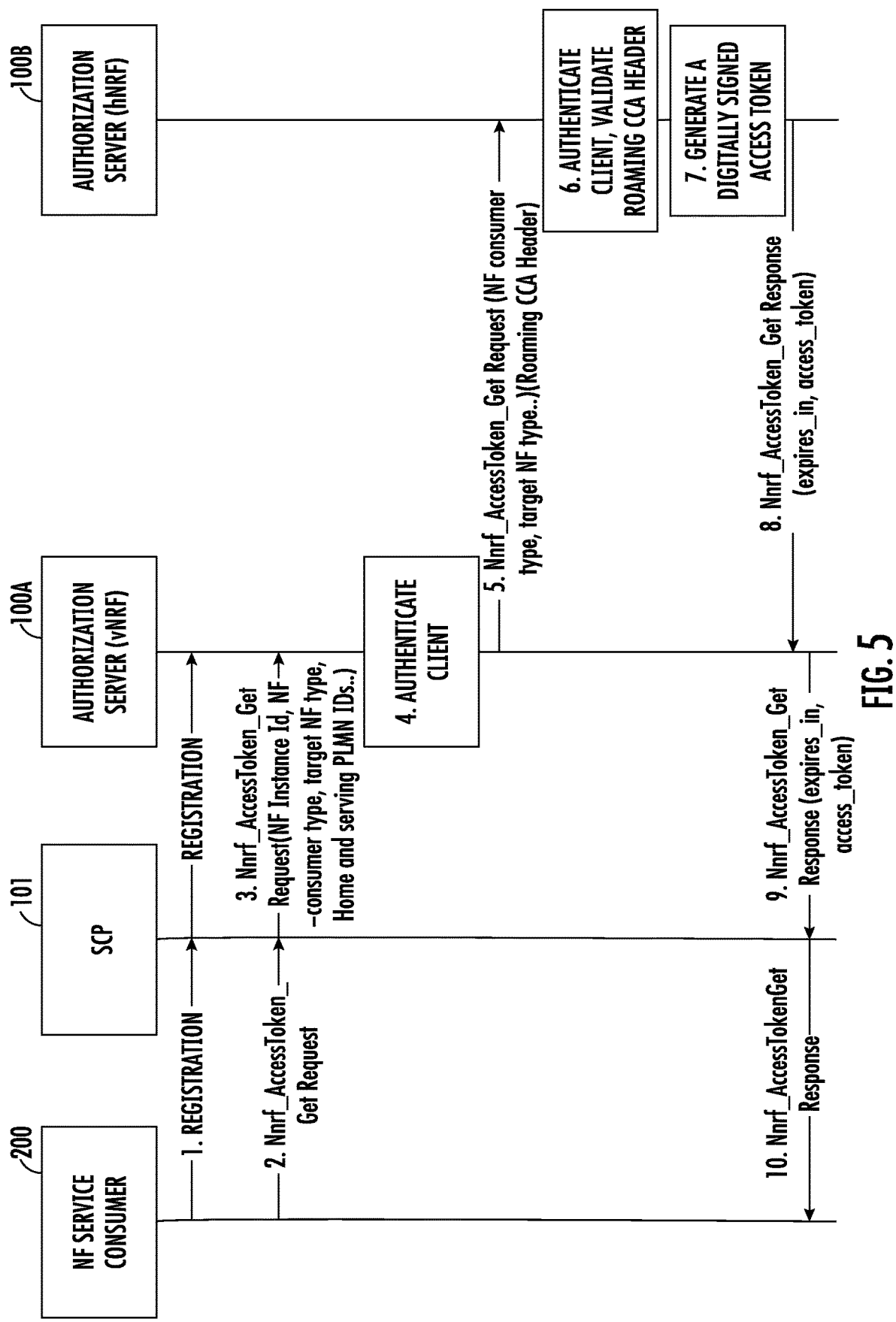
FIG. 5 is a message flow diagram illustrating inter-PLMN communications between NRFs where the visited network uses indirect communications via 3GPP communications model D.

FIG. 4 illustrates the securing of inter-PLMN communications between NRFs for direct communications according to 3GPP communication model A or model B where the access token request is sent directly from the NF service consumer to the vNRF. The subject matter described herein also applications to 3GPP indirect communications models where the access token request is sent via an SCP to the vNRF. One example of such indirect communications is indirect communications with delegated discovery according to 3GPP communication model D. The subject matter described herein may also be used to secure indirect communications between NRFs according to 3GPP communication model C. FIG. 5 is a message flow diagram illustrating inter-PLMN communication between NRFs where the visited network uses indirect communications via 3GPP communications model D. Referring to FIG. 5, in line 1, NF service consumer 200 performs NF registration with vNRF 100A via SCP 101. In step 2, NF service consumer 200 sends an access token request message to SCP 101 requesting an access token for an NF service producer in the hPLMN. The access token request may identify an NF type of a producer NF in the hPLMN or a specific NF instance ID of a producer NF in the hPLMN. In step 3, SCP 101 sends the access token request to vNRF 100A. In step 4, vNRF 100A authenticates consumer NF 200. vNRF 100A identifies the access token request as being directed to the hPLMN based on the home PLMN ID in the access token request, generates the roaming CCA header, and appends the roaming CCA header to the access token request. In step 5, vNRF 100A forwards the access token request including the roaming CCA header to hNRF 100B. hNRF 100B, in step 6, authorizes NF service consumer 200 and validates the roaming CCA header. As indicated above, validating the roaming CCA header may include determining that the public key certificate is issued from a trusted source and is unexpired, verifying the digital signature using the public key of vNRF 100A, and verifying that the CCA claims have expected values.

In step 7, hNRF 100B generates an OAuth 2.0 access token with appropriate claims as defined in clause 13.4.1.1 of 3GPP TS 33.501. hNRF 100B digitally signs the access token based on a shared secret with NF service consumer 200 or a private key as specified in IETF RFC 7515. In step 8, hNRF 100B generates an access token response message and forwards the access token response message to vNRF 100A. In step 9, vNRF 100A forwards the access token response message to SCP 101. In step 10, SCP 101 forwards the access token response message to NF service consumer 200. NF service consumer 200 stores the received access token and can use the access token for accessing services from NF service producers in the hPLMN during the validity time of the access token.

Figure 6:
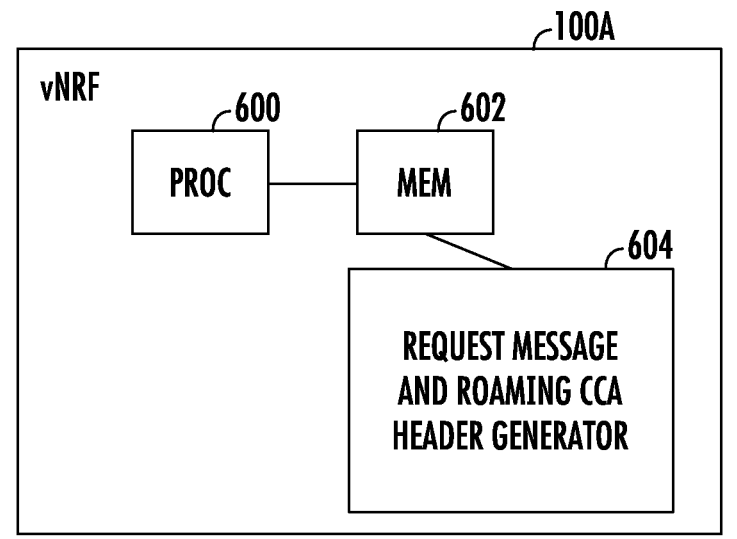
FIG. 6 is a block diagram illustrating an exemplary architecture for an hNRF and vNRF for inter-PLMN communications using the roaming CCA header.
Figure 6:
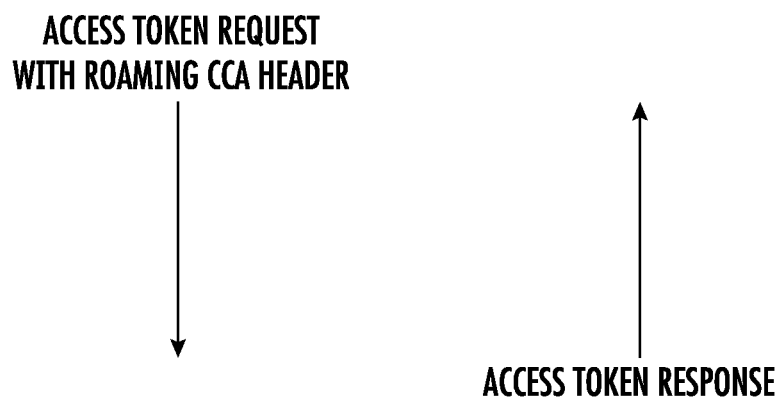
Figure 6:
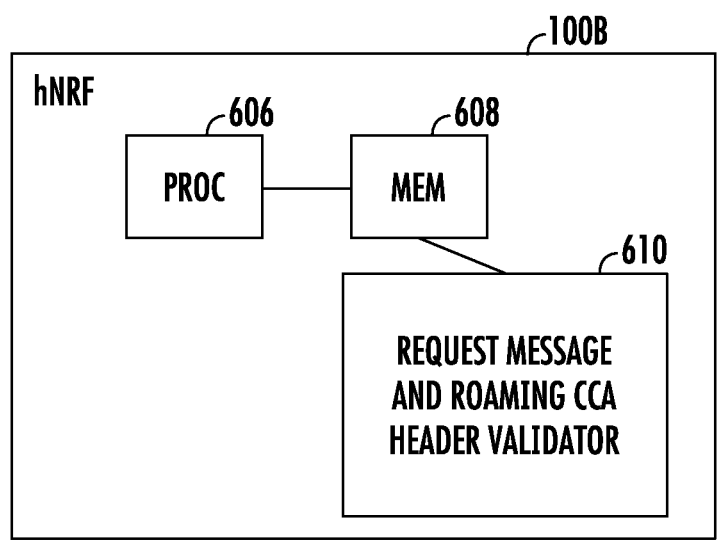

FIG. 6 is a block diagram illustrating an exemplary architecture for an hNRF and a vNRF for inter-PLMN communications using the roaming CCA header. Referring to FIG. 6, vNRF 100A includes at least one processor 600 and a memory 602. vNRF 100A further includes a request message and roaming CCA header generator 604 for generating request messages, such as access token request messages, with roaming CCA headers. The access token requests may be OAuth 2.0 access token requests directed towards hNRF 100B when a roaming UE seeks to access services provided by an NF service producer in the hPLMN. The roaming CCA header may include a public key certificate of vNRF 100A signed with the private key of vNRF 100A. The roaming CCA header may also include CCA claims, including a subject claim, an audience claim, a timestamp, and an expiration time. Request message and roaming CCA header generator 604 may be implemented using computer executable instructions stored in memory 602 and executed by processor 600.

hNRF 100B also includes at least one processor 606 and memory 608. hNRF 100B further includes a request message and roaming CCA header validator 610. Request message and roaming CCA header validator 610 receives request messages, such as access token request messages, from NRFs in other networks, reads the roaming CCA headers from the access token requests, validates the roaming CCA headers, and, in response to successful validation of the roaming CCA headers, generates and sends access token responses to the requesting NRFs. Validation of the roaming CCA headers may include verifying the digital signature of the vNRF using a public key of the vNRF, verifying that the public key certificate in the access token request is unexpired and from a trusted source, and verifying that the roaming CCA header claims have expected values. Request message and roaming CCA header validator 610 may be implemented using computer executable instructions stored in memory 608 and executed by processor 606.

Figure 7:
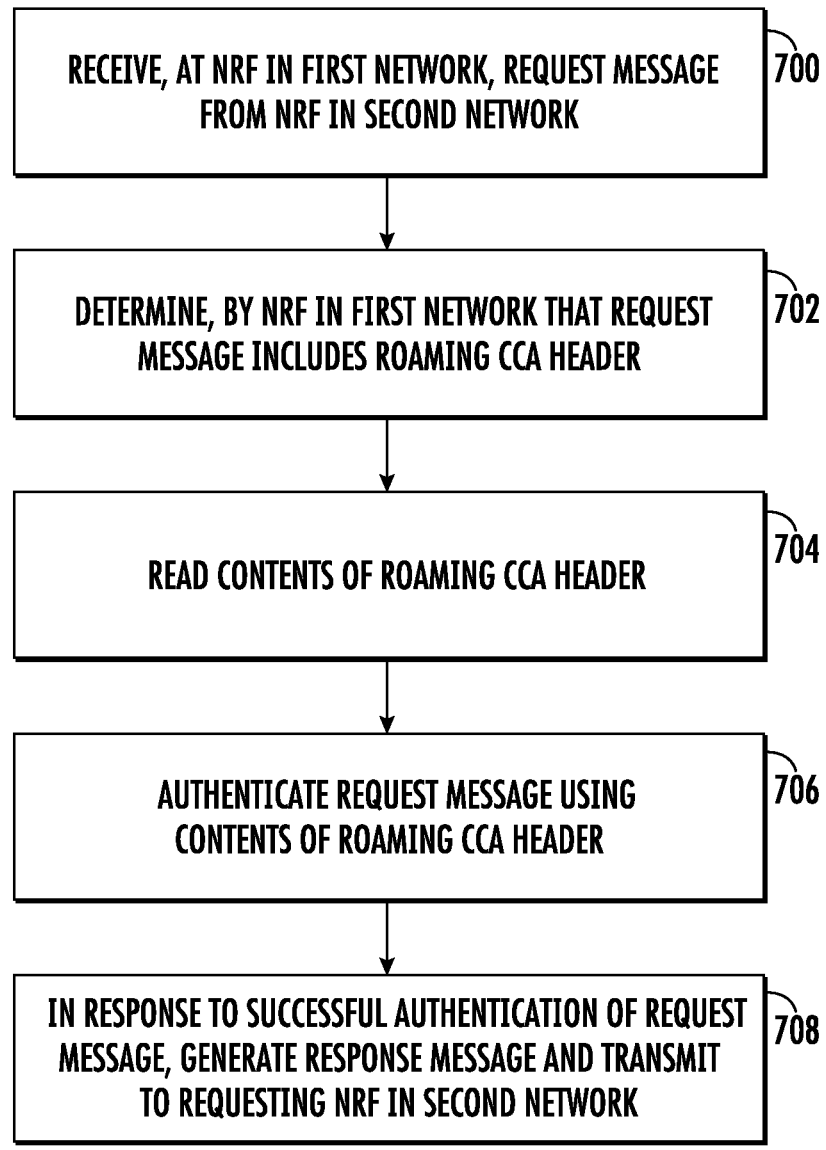
FIG. 7 is a flow chart illustrating an exemplary process performed by an hNRF for authenticating an access token request received from a vNRF.

FIG. 7 is a flow chart illustrating an exemplary process performed by an hNRF for authenticating an access token request received from a vNRF. Referring to FIG. 7, in step 700, the process includes receiving, at an NRF in a first network, a request message from an NRF in a second network separate from the first network. For example, an NRF, such as hNRF 100B, may receive an access token request from an NRF in another network, such as vNRF 100A.

In step 702, the process includes determining, by the NRF in the first network, that the request message includes a roaming CCA header. For example, request message and roaming CCA header validator 610 of hNRF 100B may determine that the access token request includes a roaming CCA header including parameters for authenticating the sending NRF.

In step 704, the process includes, in response to determining that the request message includes a roaming CCA header, reading contents of the header. For example, request message and roaming CCA header validator 610 of hNRF 100B may read the contents of the roaming CCA header, where the contents include a public key certificate, a digital signature, and CCA claims.

In step 706, the process includes authenticating the request message using the contents of the roaming CCA header. For example, request message and roaming CCA header validator 610 may verify that the public key certificate is from a trusted source and is unexpired, that the digital signature of vNRF 100A is valid, and that the CCA claims have expected values.

In step 708, the process includes, in response to successful authentication of the request message, generating a response message to the request message and transmitting the response message to the NRF in the second network. For example, request message and roaming CCA header validator 610 may, in response to successful validation of the roaming CCA header, generate an access token response message and transmit the response to the NRF in the visited network.

Figure 8:
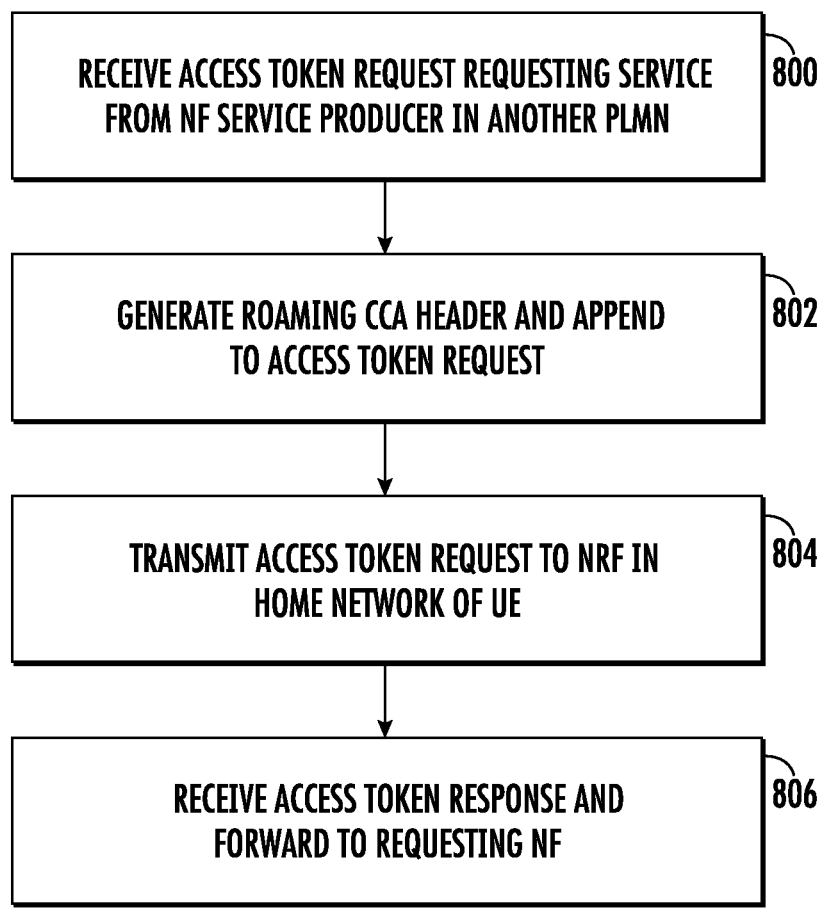
FIG. 8 is a flow chart illustrating an exemplary process performed by a vNRF for generating a secure access token request including a roaming CCA header.

FIG. 8 is a flow chart illustrating an exemplary process performed by a vNRF for generating a secure access token request including a roaming CCA header. Referring to FIG. 8, in step 800, the process includes receiving an access token request requesting access to a service provided by an NF service producer in another PLMN. For example, vNRF 100A may receive an access token request from an NF service consumer or an SCP requesting access to services provided by an NF service producer in the home PLMN of a UE currently roaming in the PLMN of vNRF 100A.

In step 802, the process includes generating a roaming CCA header and appending the roaming CCA header to the access token request. For example, request message and roaming CCA header generator 604 of vNRF 100A may generate a roaming CCA header including the public key certificate of vNRF 100A, a digital signature generated by vNRF 100A using a private key of vNRF 100A, and CCA claims.

In step 804, the process includes transmitting the access token request to an NRF in the home network of the UE. For example, request message and roaming CCA header generator 604 of vNRF 100A may transmit the access token request to hNRF 100B located in the home network of the UE.

In step 806, the process includes receiving an access token response from the NRF in the home network of the UE and transmitting the access token response to the requesting entity. For example, vNRF 100A may receive an access token response including an OAuth 2.0 access token from hNRF 100B and forward the access token response message to the requesting NF service consumer or SCP.

Exemplary advantages of the subject matter described herein include enhanced security for communications between NRFs located in different networks. Instead of relying solely on implicit authentication via the SEPPs, the subject matter described herein provides additional authentication specific to the NRFs. Using the roaming CCA header as described herein, inter-PLMN communications between NRFs are secured by the combination of a public key certificate, a digital signature, and roaming CCA claims. Access token and other inter-PLMN service-based interface requests between NRFs are thereby made more secure and the likelihood of a hacker obtaining an OAuth 2.0 access token without authorization is reduced.

The disclosure of each of the following references is hereby incorporated herein by reference in its entirety.

REFERENCES

1. $3^{rd}$ Generation Partnership Project; Technical Specification Group Core Network and Terminals; 5G System; Network Function Repository Services; Stage 3 (Release 18) 3GPP TS 29.510 V18.1.0 (2022-12)
2. $3^{rd}$ Generation Partnership Project; Technical Specification Group Services and System Aspects; Security architecture and procedures for 5G system (Release 18) 3GPP TS 33.501 V18.0.0 (2022-12)
3. Jones et al., JSON Web Signature, IETF RFC 7515 (May 2015)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for authenticating between network function (NF) repository functions (NRFs) across different networks, the method comprising:
   receiving, at an NRF in a first network, a request message from an NRF in a second network separate from the first network and including a roaming client credentials assertion (CCA) header added to the request by the NRF in the second network;
   determining, by the NRF in the first network, that the request message includes the roaming CCA header;
   in response to determining, by the NRF in the first network that the request message includes the roaming CCA header, reading contents of the roaming CCA header;
   authenticating, by the NRF in the first network, the request message using the contents of the roaming CCA header, wherein authenticating the request message includes verifying, by the NRF in the first network and using a public key of the NRF in the second network, the digital signature of the NRF in the second network; and
   in response to successful authentication of the request message, generating, by the NRF in the first network, a response message to the request message and transmitting the response message to the NRF in the second network.

2. The method of claim 1 wherein the NRF in the first network operates as a home NRF and the NRF in the second network operates as a visited NRF.
3. The method of claim 1 wherein receiving the request message comprises receiving an access token request message.
4. The method of claim 3 wherein receiving the access token request message comprises receiving an OAuth 2.0 access token request message.
5. The method of claim 4 wherein the OAuth 2.0 access token request message is received from an NF service consumer in the second network.
6. The method of claim 4 wherein the OAuth 2.0 access token request is received from a service communication proxy (SCP) in the second network.
7. The method of claim 1 wherein reading contents of the roaming CCA header includes reading a public key certificate from the request message and authenticating the request message includes determining that the public key certificate was issued from a trusted source and is unexpired.
8. The method of claim 7 wherein reading contents of the roaming CCA header includes reading the digital signature and the public key from the roaming CCA header.
9. The method of claim 8 wherein reading contents of the roaming CCA header includes reading CCA claims from the CCA header and verifying the CCA claims using CCA claims stored at the NRF in the first network.
10. The method of claim 9 wherein verifying the CCA claims includes determining whether a subject claim of the roaming CCA header matches an NF instance ID of the NRF in the second network, determining that an audience claim in the roaming CCA header matches an audience type of the NRF In the first network, and validating a timestamp and an expiration time in the roaming CCA header.
11. A system for authenticating between network function (NF) repository functions (NRFs) across different networks, the system comprising:
    an NRF for operating in a first network and including at least one processor and a memory; and
    a request message and roaming CCA header validator implemented by the at least one processor of the NRF configured for operating in the first network, the roaming CCA header validator configured for receiving a request message from an NRF in a second network separate from the first network and including a roaming client credentials assertion (CCA) header added to the request by the NRF in the second network, determining that the request message includes the roaming CCA header, in response to determining that the request message includes the roaming CCA header, reading contents of the header, authenticating the request message using the contents of the roaming CCA header, wherein authenticating the request message includes verifying, by the NRF configured for operating in the first network and using a public key of the NRF in the second network, the digital signature of the NRF in the second network and, in response to successful authentication of the request message, generating a response message to the request message and transmitting the response message to the NRF in the second network.
12. The system of claim 11 wherein the NRF in the first network operates as a home NRF and the NRF in the second network operates as a visited NRF.
13. The system of claim 11 wherein the request message comprises an access token request message.

14. The system of claim 13 wherein the access token request message comprises an OAuth 2.0 access token request message.

15. The system of claim 14 wherein the OAuth 2.0 access token request message is received from an NF service consumer or a service communication proxy (SCP) in the second network.

16. The system of claim 11 wherein, in reading contents of the roaming CCA header, the request message and roaming CCA header validator is configured to read reading a public key certificate from the roaming CCA header and, in authenticating the request message, the request message and roaming CCA header validator is configured to determine that the public key certificate was issued from a trusted source and is unexpired.

17. The system of claim 16 wherein, in reading contents of the roaming CCA header, the request message and roaming CCA header validator is configured to read the digital signature and the public key from the roaming CCA header.

18. The system of claim 17 wherein, in reading contents of the roaming CCA header, the request message and roaming CCA header validator is configured to read CCA claims from the CCA header and, in authenticating the request message, the request message and roaming CCA header validator is configured to verify the CCA claims using CCA claims stored at the NRF configured to operate in the first network.

19. The system of claim 18 wherein, in verifying the CCA claims, the request message and roaming header CCA validator is configured to determine whether a subject claim of the roaming CCA header matches an NF instance ID of the NRF in the second network, determine that an audience claim in the roaming CCA header matches an audience type of the NRF In the first network, and validating a timestamp and an expiration time in the roaming CCA header.

20. A non-transitory computer readable medium having stored thereon executable instructions that when executed by a processor of a computer controls the computer to perform steps comprising:
    receiving, at a network function (NF) repository function (NRF) in a first network, a request message from an NRF in a second network separate from the first network and including a roaming client credentials assertion (CCA) header added to the request by the NRF in the second network;
    determining, by the NRF in the first network, that the request message includes the roaming CCA header;
    in response to determining that the request message includes the roaming CCA header, reading, by the NRF in the first network, contents of the header;
    authenticating, by the NRF in the first network, the request message using the contents of the roaming CCA header, wherein authenticating the request message includes verifying, by the NRF in the first network and using a public key of the NRF in the second network, a digital signature of the NRF in the second network included in the roaming CCA header; and
    in response to successful authentication of the request message, generating, by the NRF in the first network, a response message to the request message and transmitting the response message to the NRF in the second network.

\* \* \* \* \*